(12) United States Patent
Otsuka et al.

(10) Patent No.: US 8,963,522 B2
(45) Date of Patent: Feb. 24, 2015

(54) CURRENT-DIRECTION DETECTING CIRCUIT AND DC-DC CONVERTER

(75) Inventors: Masafumi Otsuka, Yokohama (JP); Yoichi Tokai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 567 days.

(21) Appl. No.: 13/355,843

(22) Filed: Jan. 23, 2012

(65) Prior Publication Data
US 2012/0235656 A1 Sep. 20, 2012

(30) Foreign Application Priority Data

Mar. 14, 2011 (JP) .................. 2011-055548

(51) Int. Cl.
| | |
|---|---|
| *G01R 19/14* | (2006.01) |
| *G05F 1/618* | (2006.01) |
| *H02M 3/155* | (2006.01) |
| *H02M 3/158* | (2006.01) |
| *H02M 1/00* | (2006.01) |

(52) U.S. Cl.
CPC .... *H02M 3/1588* (2013.01); *H02M 2001/0009* (2013.01); *Y02B 70/1466* (2013.01)
USPC .......................................... 323/282; 324/133

(58) Field of Classification Search
CPC .......... G01R 19/14; H02M 2001/0009; H03K 5/1534; H03K 5/1536
USPC ........ 363/16, 17, 21.01, 21.06, 37, 54, 56.12, 363/63, 68, 81, 89, 95; 361/9, 10, 18, 23, 361/42, 45, 93.01, 94, 102, 103, 111, 115, 361/117, 145, 245; 318/801, 807, 727, 496; 324/133

See application file for complete search history.

(56) References Cited

U.S. PATENT DOCUMENTS

| | | | |
|---|---|---|---|
| 7,821,236 B2 | 10/2010 | Hasegawa et al. | |
| 2009/0295350 A1 | 12/2009 | Yamada | |
| 2012/0195083 A1* | 8/2012 | Teng et al. .................... | 363/126 |
| 2013/0293211 A1* | 11/2013 | Chen ............................. | 323/282 |

FOREIGN PATENT DOCUMENTS

JP 2008-125223 5/2008

* cited by examiner

*Primary Examiner* — Adolf Berhane
*Assistant Examiner* — Jye-June Lee
(74) *Attorney, Agent, or Firm* — Oblon, Spivak, McClelland, Maier & Neustadt, L.L.P.

(57) ABSTRACT

According to one embodiment, a circuit includes an amplifier, first and second capacitors, a switch and a monitoring-comparator. The amplifier amplifies source and drain voltages to output first and second amplified-signals. The first and second capacitors are connected to the amplifier's first and second terminals. The first and second amplified-signals are outputted from the first and second terminals. The switch forms first and second loops when a switching-transistor is OFF. The switch supplies a common-reference-voltage to the first and second loops to store charge in the first and second capacitors. The switch ends the first and second loops based on a gate-signal when the switching-transistor is ON. The monitoring-comparator compares first and second inputs. The monitoring-comparator outputs a signal depending on a comparison result when the switching-transistor is ON. The first and second inputs are input through the first and second capacitors.

15 Claims, 6 Drawing Sheets

CURRENT-DIRECTION DETECTING CIRCUIT AND DC-DC CONVERTER

CROSS REFERENCE TO RELATED APPLICATIONS

This application is based upon and claims the benefit of priority from the prior Japanese Patent Application No. 2011-055548, filed on Mar. 14, 2011, the entire contents of which are incorporated herein by reference.

FIELD

Embodiments described herein relate generally to a current-direction detecting circuit and a DC-DC converter.

BACKGROUND A general DC-DC converter includes two switching transistors (a high-side switching transistor and a low-side switching transistor) and a gate controller.

An input voltage is supplied to the high-side switching transistor from an input terminal. A power supply voltage is supplied to the low-side switching transistor from a low-potential power supply. The gate controller turns on and off gates of the two switching transistors. An inductor current according to states (an on-state in which the gate is turned on and an off-state in which the gate is turned off) of the gates of the two switching transistors is passed through an inductor. Therefore, an input voltage is converted into an output voltage.

A reverse current is passed through the inductor in an opposite direction to the inductor current under a predetermined condition. The reverse current is passed toward a low-side switching transistor side in the case of a step-down DC-DC converter, and the reverse current is passed toward a high-side switching transistor side in the case of a step-up DC-DC converter. There is a case that a current-direction detecting circuit for detecting the reverse current is provided in order to reduce a power loss caused by the reverse current and in order to improve conversion efficiency degradation caused by the reverse current. The current-direction detecting circuit detects a direction of a current passed through the switching transistor and outputs a detection result to the gate controller. When the reverse current is detected, the gate controller turns off the switching transistor through which the reverse current is passed.

DETAILED DESCRIPTION

Embodiments will now be explained with reference to the accompanying drawings.

In general, according to one embodiment, a current-direction detecting circuit detects a direction of current that is passed between a source end and a drain end of a switching transistor turning on and off based on a gate signal. The circuit includes an amplifier, a first offset compensation capacitor, a second offset compensation capacitor, a switch and a monitoring comparator. The amplifier amplifies a voltage on the source end to output a first amplified signal and amplifies a voltage on the drain end to output a second amplified signal. The first offset compensation capacitor is connected to a first output terminal of the amplifier. The first amplified signal is outputted from the first output terminal. The second offset compensation capacitor is connected to a second output terminal of the amplifier. The second amplified signal is outputted from the second output terminal. The switch forms a first loop circuit including the amplifier and the first offset compensation capacitor based on the gate signal when the switching transistor is turned off. The switch forms a second loop circuit including the amplifier and the second offset compensation capacitor based on the gate signal when the switching transistor is turned off. The switch supplies a common reference voltage to the first loop circuit and the second loop circuit in such a manner that a charge is stored in the first offset compensation capacitor and the second offset compensation capacitor. The switch ends the first loop circuit and the second loop circuit based on the gate signal when the switching transistor is turned on. The monitoring comparator compares a first input signal with a second input signal. The monitoring comparator outputs a signal in accordance with a comparison result when the switching transistor is turned on. The first input signal is input through the first offset compensation capacitor. The second input signal is input through the second offset compensation capacitor.

Figure 1:
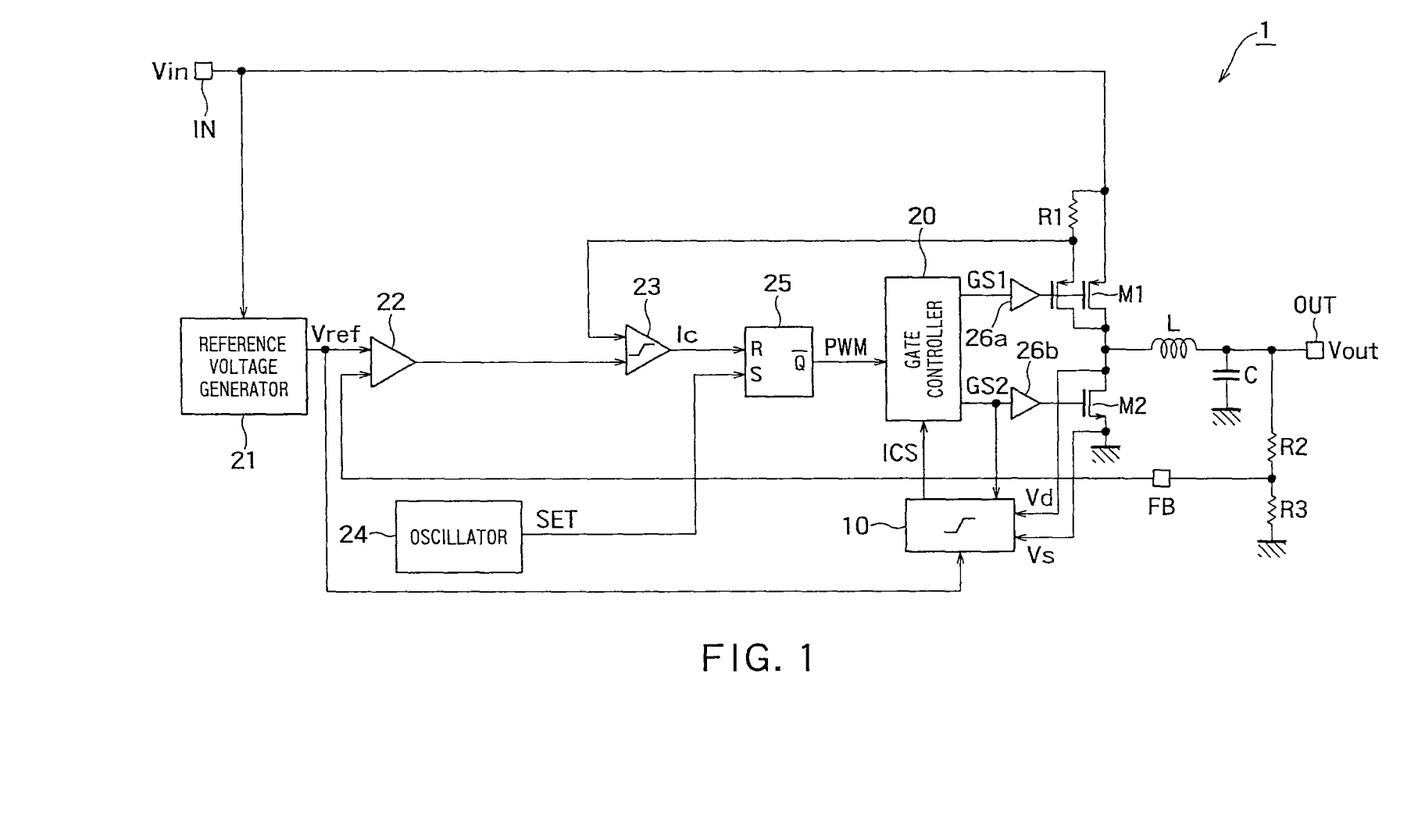
FIG. 1 is a schematic diagram of a DC-DC converter 1 of the embodiment.

A configuration of a DC-DC converter of an embodiment will be described. FIG. 1 is a schematic diagram of a DC-DC converter 1 of the embodiment.

The DC-DC converter 1 is a step-down DC-DC converter that converts an input voltage Vin supplied from the outside to an input terminal IN into an output voltage Vout, and then outputs the output voltage Vout to the outside of the DC-DC converter 1 from an output terminal OUT. The DC-DC converter 1 includes a current-direction detecting circuit 10, a gate controller 20, a reference voltage generator 21, an error amplifier 22, a current comparator 23, an oscillator 24, a flip-flop 25, a first buffer 26a, a second buffer 26b, a first switching transistor M1, a second switching transistor M2, an inductor L, a capacitor C, and resistors R1 to R3.

The input voltage Vin is supplied to the reference voltage generator 21. The reference voltage generator 21 generates a reference voltage Vref based on the input voltage Vin.

A feedback signal FB corresponding to the output voltage Vout is supplied to the error amplifier 22 through an inverting input terminal, and the reference voltage Vref is supplied to the error amplifier 22 through a non-inverting input terminal. The error amplifier 22 amplifies an error voltage difference between the reference voltage Vref and the feedback signal FB.

A sense current at one end (an end portion that is not connected to the input terminal IN) of the resistor R1 connected to the input terminal IN and the error voltage are supplied to the current comparator 23. The current comparator 23 compares the error voltage with the sense current, and then generates a binary signal Ic according to a comparison result (that is, a difference between the error voltage and the sense current).

The oscillator 24 generates a set signal SET having a predetermined clock waveform.

The binary signal Ic is supplied to the flip-flop 25 through a reset terminal R, and the set signal SET is supplied to the flip-flop 25 through a set terminal S. The flip-flop 25 generates a high-level pulse-width modulated signal PWM when the set signal SET is a high level.

The pulse-width modulated signal PWM and a current-direction signal ICS indicating a detection result (that is, whether the reverse current is detected) of the current-direction detecting circuit 10 are supplied to the gate controller 20. Based on the pulse-width modulated signal PWM, the gate controller 20 generates a first gate signal GS1 that turns on and off the first switching transistor M1 and a second gate signal GS2 that turns on and off the second switching transistor M2. When the current-direction detecting circuit 10 detects the reverse current, the gate controller 20 generates the second gate signal GS2 that turns off the second switching transistor M2. That is, in FIG. 1, the second switching transistor M2 is a monitoring target transistor to be monitored in order to detect the current direction.

The first switching transistor M1 is the high-side switching transistor. In the first switching transistor M1, one end is connected to the input terminal IN (first power potential) and the other end is connected to the inductor L. The input voltage Vin and the first gate signal GS1 are supplied to the first switching transistor M1. The first switching transistor M1 is turned on and off in response to the first gate signal GS1. For example, the first switching transistor M1 is a positive channel Metal Oxide Semiconductor (pMOS) transistor.

The second switching transistor M2 is the low-side switching transistor. In the second switching transistor M2, one end is connected to a low-level power supply (second power potential), and the other end is connected to the inductor L and a second end of the first switching transistor M1. A power supply voltage (for example, a ground voltage of a ground terminal) of the low-level power supply and the second gate signal GS2 are supplied to the second switching transistor M2. The second switching transistor M2 is turned on and off in response to the second gate signal GS2. For example, the second switching transistor M2 is an negative channel Metal Oxide Semiconductor (nMOS) transistor.

A first end of the inductor L is connected to the other end of the first switching transistor M1, the other end of the second switching transistor M2, and the current-direction detecting circuit 10. A second end of the inductor L is connected to the capacitor C and an output terminal OUT. An output signal of the first switching transistor M1 or the second switching transistor M2 is supplied to the inductor L, and an inductor current is passed through the inductor L according to the output signal. When the inductor current is passed, a voltage (output voltage Vout) at the second end of the inductor L is output to the outside of the DC-DC converter 1 through the output terminal OUT.

The current-direction detecting circuit 10 is connected to the source end that is one end of the second switching transistor M2 (that is, the monitoring target transistor), a drain end that is the other end of the second switching transistor M2, and the gate controller 20 that turns on and off the second switching transistor M2. A source voltage Vs on a source-end side of the second switching transistor M2, a drain voltage Vd on a drain-end side of the second switching transistor M2, the second gate signal GS2, and the reference voltage Vref are supplied to the current-direction detecting circuit 10. The current-direction detecting circuit 10 is operated in a sampling mode when the second switching transistor M2 is turned off, and is operated in a detection mode when the second switching transistor M2 is turned on. In the detection mode, the current-direction detecting circuit 10 detects the current direction of the current passed between the source end and the drain end of the monitoring target transistor.

Figure 2:
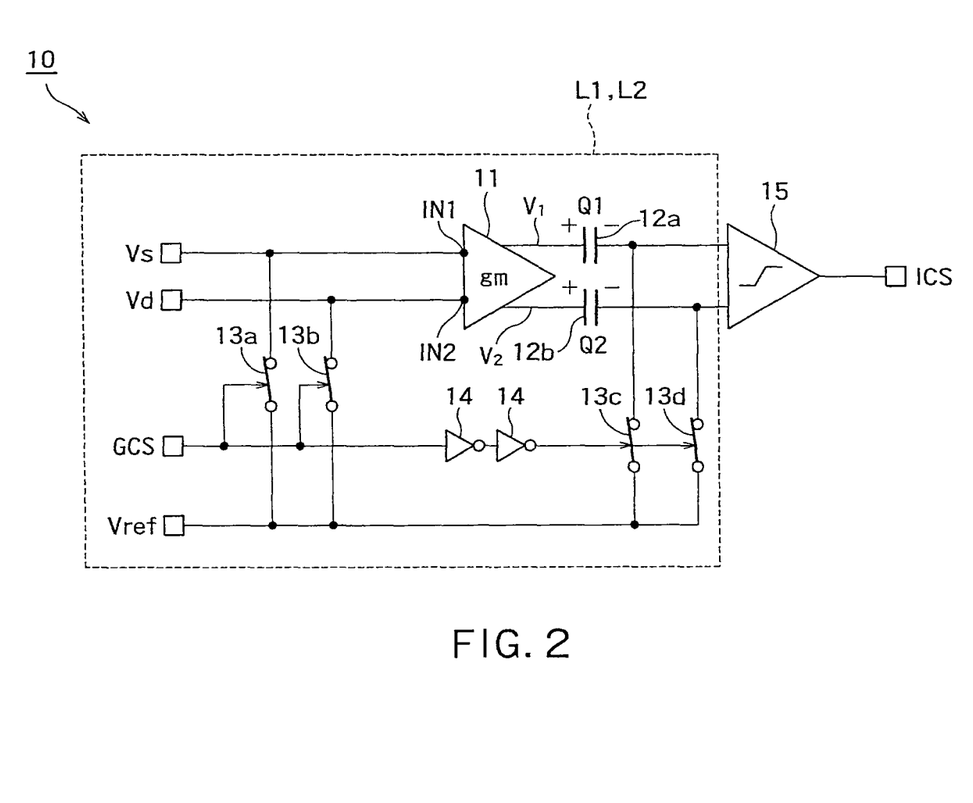
FIG. 2 is a configuration diagram illustrating the current-direction detecting circuit 10 that is operated in the sampling mode of the embodiment.
Figure 3:
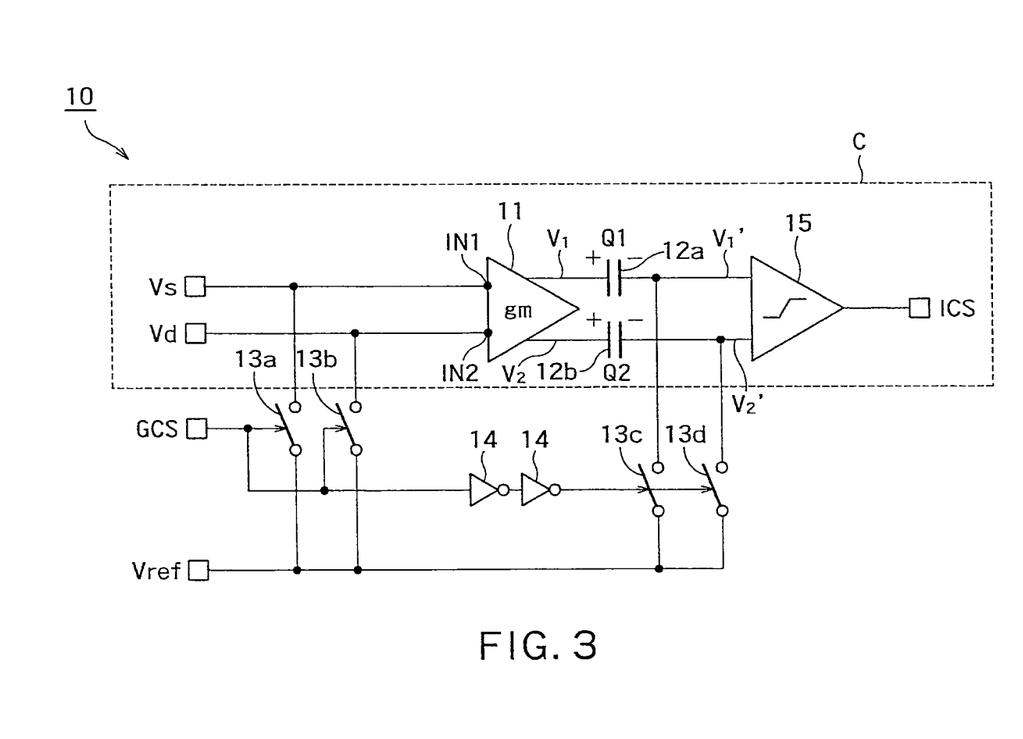
FIG. 3 is a configuration diagram illustrating the current-direction detecting circuit 10 that is operated in the detection mode of the embodiment.

A configuration of the current-direction detecting circuit of the embodiment will be described. FIG. 2 is a configuration diagram illustrating the current-direction detecting circuit 10 that is operated in the sampling mode of the embodiment. FIG. 3 is a configuration diagram illustrating the current-direction detecting circuit 10 that is operated in the detection mode of the embodiment.

In the current-direction detecting circuit 10, the operation in the detection mode and the operation in the sampling mode are alternately repeated in response to a monitoring target gate signal GCS supplied to the monitoring target transistor.

As illustrated in FIG. 2, the current-direction detecting circuit 10 includes a monitoring amplifier 11, a first offset compensation capacitor 12a, a second offset compensation capacitor 12b, switches 13a to 13d, a buffer 14, and a monitoring comparator 15. In the sampling mode, the switches 13a to 13d are turned on.

The switches 13a to 13d switch a signal path in the current-direction detecting circuit 10 in response to the monitoring target gate signal GCS generated by the gate controller 20. The monitoring target gate signal GCS is supplied to the switches 13a and 13b. In the case of the step-down DC-DC converter of FIG. 1, the monitoring target gate signal GCS is the second gate signal GS2. The monitoring target gate signal GCS is supplied to the switches 13c and 13d through the buffer 14. The switches 13a to 13d are turned on based on the monitoring target gate signal GCS when the monitoring target transistor is turned off, and the switches 13a to 13d are turned off based on the monitoring target gate signal GCS when the monitoring target transistor is turned on. Therefore, the current-direction detecting circuit 10 is operated in the sampling mode when the monitoring target transistor is turned off, and is operated in the detection mode when the monitoring target transistor is turned on.

In the sampling mode of FIG. 2, the switches 13a to 13d form a first loop circuit L1 and a second loop circuit L2 based on the monitoring target gate signal GCS when the monitoring target transistor is turned off, and supply the common reference voltage Vref to the first loop circuit L1 and the second loop circuit L2. The first loop circuit L1 includes the monitoring amplifier 11 and the first offset compensation capacitor 12a. The second loop circuit L2 includes the monitoring amplifier 11 and the second offset compensation capacitor 12b.

The source voltage Vs of the monitoring target transistor is supplied to the monitoring amplifier 11 through a first input terminal IN1, and the drain voltage Vd of the monitoring target transistor is supplied to the monitoring amplifier 11 through a second input terminal IN2. The monitoring amplifier 11 amplifies the source voltage Vs to generate a first amplified voltage V1, and amplifies the drain voltage Vd to generate a second amplified voltage V2.

The first offset compensation capacitor 12a and the second offset compensation capacitor 12b are provided between output terminals of the monitoring amplifier 11 and input terminals of the monitoring comparator 15, respectively. The first amplified voltage V1 and the reference voltage Vref are supplied to the first offset compensation capacitor 12a, and a first charge Q1 corresponding to a difference between the first amplified voltage V1 and the reference voltage Vref is stored in the first offset compensation capacitor 12a. The second amplified voltage V2 and the reference voltage Vref are supplied to the second offset compensation capacitor 12b, and a second charge Q2 corresponding to a difference between the second amplified voltage V2 and the reference voltage Vref is stored in the second offset compensation capacitor 12b. That is, the first charge Q1 and the second charge Q2, which cancel offset voltages existing in the signal paths input to the two input terminals of the monitoring comparator 15, are stored in the first offset compensation capacitor 12a and the second offset compensation capacitor 12b, respectively.

The monitoring comparator 15 is set so as not to output a current-direction signal ICS, while the first charge Q1 and the second charge Q2 are stored in the first offset compensation capacitor 12a and the second offset compensation capacitor 12b, respectively (that is, in the sampling mode). Alternatively, in the sampling mode, the gate controller 20 may be set so as not to use the current-direction signal ICS output from the monitoring comparator 15.

In the detection mode of FIG. 3, the switches 13a to 13d end the first loop circuit L1 and the second loop circuit L2 to form a comparator C based on the monitoring target gate signal GCS when the monitoring target transistor is turned on. The comparator C includes the monitoring amplifier 11, the first offset compensation capacitor 12a, the second offset compensation capacitor 12b, and the monitoring comparator 15.

The drain voltage Vd that is the voltage on the one end side of the second switching transistor is supplied to the monitoring amplifier 11 through the first input terminal IN1, and the source voltage Vs that is the voltage on the other end side of the second switching transistor is supplied to the monitoring amplifier 11 through the second input terminal IN2. The monitoring amplifier 11 amplifies the drain voltage Vd to generate the first amplified voltage V1, and amplifies the source voltage Vs to generate the second amplified voltage V2.

The monitoring comparator 15 is operated when the monitoring target transistor is turned on. A first input signal V1' is supplied to the monitoring comparator 15 through the first offset compensation capacitor 12a, and a second input signal V2' is supplied to the monitoring comparator 15 through the second offset compensation capacitor 12b. The monitoring comparator 15 compares the first input signal V1' (that is, the signal input through the first offset compensation capacitor 12a) that is a comparison input signal of the monitoring comparator 15 with the second input signal V2' (that is, the signal input through the second offset compensation capacitor 12b), and the monitoring comparator 15 outputs the binary current-direction signal ICS according to a comparison result (that is, a difference between the first input signal V1' and the second input signal V2'). The current-direction signal ICS is the signal that indicates the current direction of the current passed between the source end and the drain end of the monitoring target transistor.

There is a case that given offset voltages exist in the two input terminals of the monitoring comparator 15. However, the first input signal V1' and the second input signal V2' are input through the first offset compensation capacitor 12a in which the first charge Q1 is stored and through the second offset compensation capacitor 12b in which the second charge Q2 is stored, respectively. Accordingly, at the first offset compensation capacitor 12a and the second offset compensation capacitor 12b, the first input signal V1' and the second input signal V2' are increased by the voltages corresponding to the first charge Q1 and the second charge Q2 from the first amplified voltage V1 and the second amplified voltage V2, which are the outputs of the monitoring amplifier 11, respectively. As described above, the first charge Q1 and the second charge Q2 cancel the offset voltages of the monitoring comparator 15. Therefore, each of the first input signal V1' and the second input signal V2' is substantially equal to a monitoring voltage Vb. That is, the comparison input signal in which the offset voltage has been compensated is supplied to the monitoring comparator 15. The monitoring comparator 15 compares the first input signal V1' in which the offset voltages have been compensated with the second input signal V2' in which the offset voltages have been compensated, and outputs the current-direction signal ICS to the gate controller 20 according to the comparison result (that is, the difference between the first input signal V1' and the second input signal V2'). For example, the current-direction signal ICS is "1" when the first input signal V1' is more than the second input signal V2', and the current-direction signal ICS is "0" when the first input signal V1' is equal to or lower than the second input signal V2'. The fact that the first input signal V1' is equal to or lower than the second input signal V2' means that the inductor current is passed through the inductor L. The fact that the third input signal V1' is more than the second input signal V2' means that the reverse current is passed through the inductor L. That is, the monitoring comparator 15 outputs "0" when the inductor current is passed through the inductor L, and outputs "1" when the reverse current is passed through the inductor L.

When the current-direction signal ICS is "0", the gate controller 20 generates the first gate signal GS1 and the second gate signal GS2 based on the pulse-width modulated signal PWM, thereby alternately turning on the first switching transistor M1 and the second switching transistor M2. Therefore, the input voltage Vin is converted into the output voltage Vout.

When the current-direction signal ICS is "1" (that is, when the signal input through the first offset compensation capacitor 12a is more than the signal input through the second offset compensation capacitor 12b), the gate controller 20 stops the output of the gate signal GS2 that turns on the second switching transistor M2, and the gate controller 20 outputs the gate signal GS2 that turns off the second switching transistor M2. That is, the gate controller 20 turns off the second switching transistor M2 (that is, the monitoring target transistor). Therefore, the reverse current passed through the inductor L can be suppressed to the minimum level.

Figure 4:
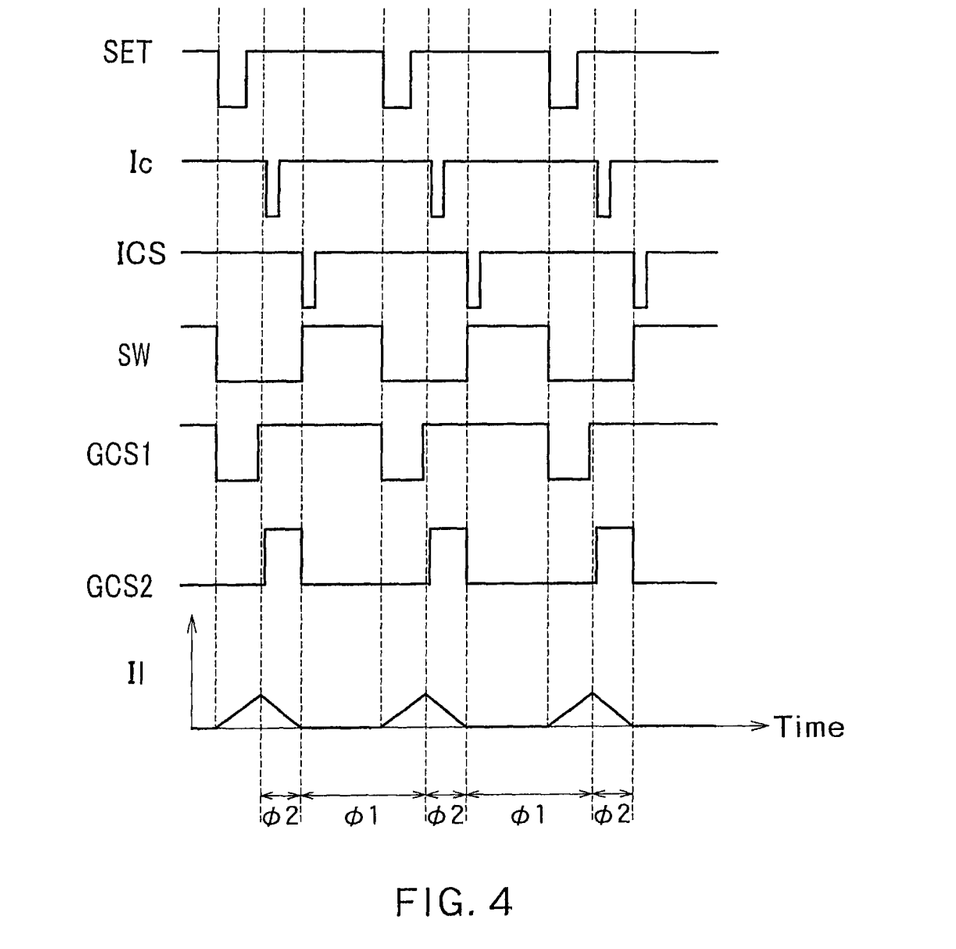
FIG. 4 is a signal waveform diagram when the current-direction detecting circuit 10 of the embodiment is used.
Figure 5:
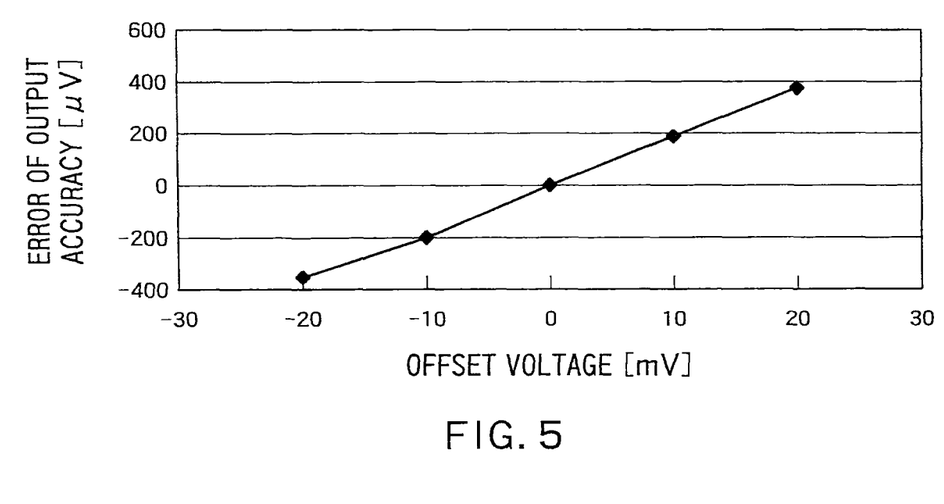
FIG. 5 is a graph illustrating a simulation result for the offset voltage and an error of output accuracy when the current-direction detecting circuit 10 of the embodiment is used.

An operation and effect of the current-direction detecting circuit of the embodiment will be described. FIG. 4 is a signal waveform diagram when the current-direction detecting circuit 10 of the embodiment is used. FIG. 5 is a graph illustrating a simulation result for the offset voltage and an error of output accuracy when the current-direction detecting circuit 10 of the embodiment is used.

As illustrated in FIG. 4, in a first half of a first period φ1, in which the first gate signal GS1 is high while the second gate signal GS2 is low, the switches 13a to 13d are turned on because a switch control signal SW is high. That is, in the first half of the first period φ1, the current-direction detecting circuit 10 is operated in the sampling mode of FIG. 2.

When the first gate signal GS1 changes from high to low, the switches 13a to 13d are turned off because the switch control signal SW changes to low. That is, in a second half of the first period φ1, in which the first gate signal GS1 is low while the second gate signal GS2 is low, the current-direction detecting circuit 10 is operated in the detection mode of FIG. 3.

When the first gate signal GS1 and the second gate signal GS2 change from low to high, a second period φ2 starts. In the second period φ2, the switches 13a to 13d are turned off because the switch control signal SW is low. That is, in the second period φ2, the current-direction detecting circuit 10 is operated in the detection mode of FIG. 3.

That is, based on at least one of the first gate signal GS1 and the second gate signal GS2, the switches 13a to 13d switch between the sampling mode in which the first loop circuit L2 and the second loop circuit L2 are formed and the detection mode in which the comparator is formed.

In FIG. 5, a horizontal axis indicates the offset voltage of the monitoring comparator 15, and a vertical axis indicates error of output accuracy representing a change amount of a threshold used by the monitoring comparator 15 due to the offset voltage. As can be seen from FIG. 5, even in the case of the offset voltage of ±20 mV, the use of the current-direction detecting circuit of the embodiment can suppress the error of output accuracy to a significantly small value of 0.4 [μV].

In order to correct the offset voltage of the monitoring comparator 15, there is another method in which an offset corrector is used. However, generally the offset corrector includes relatively large circuit components such as a register and a fuse. Accordingly, a circuit size of the current-direction detecting circuit 10 is enlarged. In order to utilize the fuse, it is necessary to cut the fuse to check whether the offset voltage is corrected. As a result, production cost of the current-direction detecting circuit 10 is increased.

On the other hand, according to the embodiment, the current-direction detecting circuit 10 can be connected to both the ends of the monitoring target transistor and the gate controller 20 that turns on and off the monitoring target transistor. When the monitoring target transistor is turned on, the current-direction detecting circuit 10 detects the direction of the current passed through the inductor L connected to the monitoring target transistor, and outputs the current-direction signal ICS indicating the detection result to the gate controller 20. On the other hand, when the monitoring target transistor is turned off, the current-direction detecting circuit 10 performs the offset correction. Accordingly, the direction of the current passed through the monitoring target transistor can accurately be detected without the general offset corrector. As a result, the detection accuracy of the reverse current can be improved while the increase of the circuit size and the production cost of the current-direction detecting circuit 10 are suppressed to the minimum level.

Figure 6:
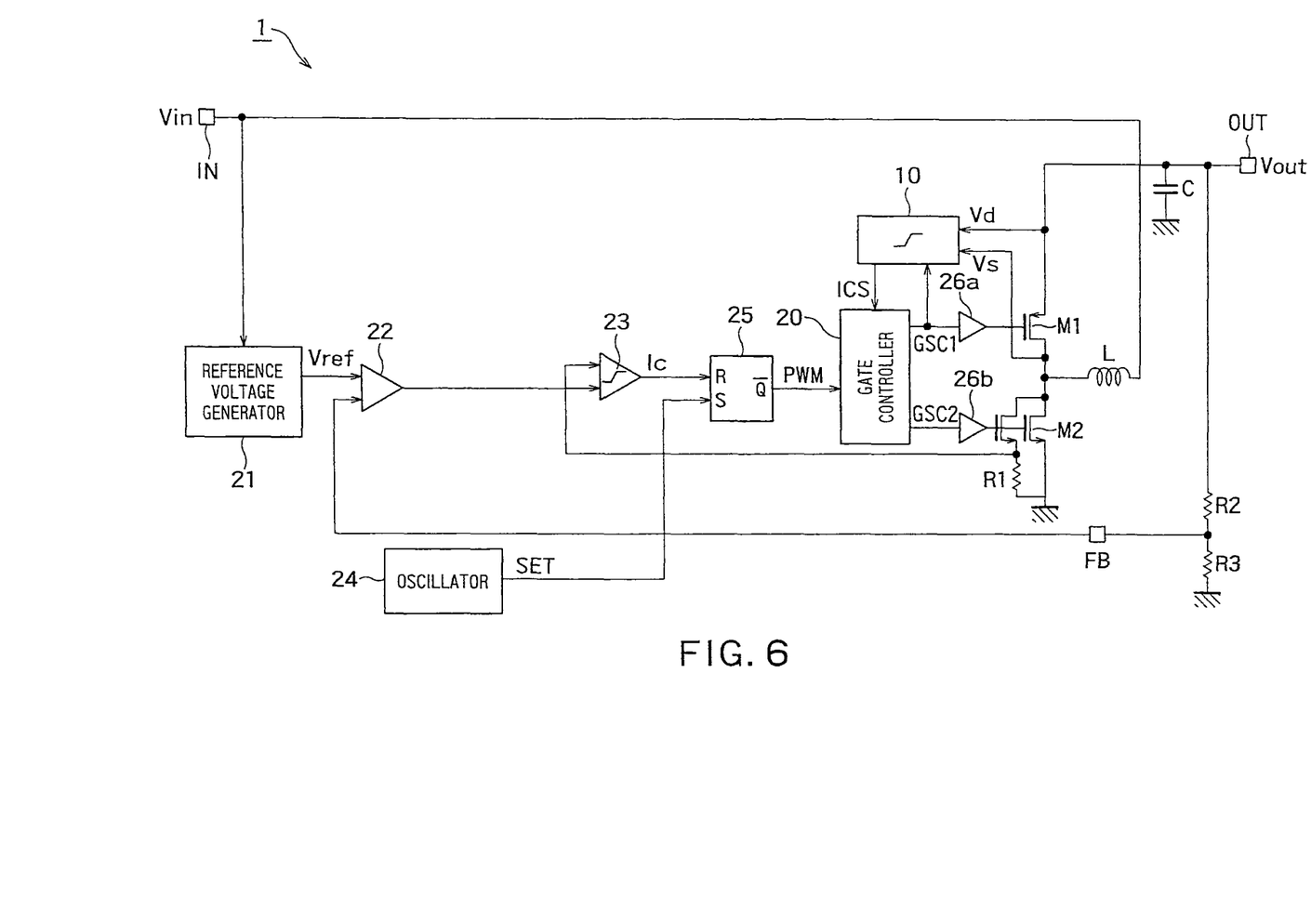
FIG. 6 is a schematic diagram of a DC-DC converter 1 according to the modification of the embodiment.

A modification of the embodiment of the invention will be described. FIG. 6 is a schematic diagram of a DC-DC converter 1 according to the modification of the embodiment.

FIG. 1 illustrates the step-down DC-DC converter in which the current-direction detecting circuit 10 is connected to both the ends of the second switching transistor M2. On the other hand, FIG. 6 illustrates a step-up DC-DC converter in which the current-direction detecting circuit 10 is connected to both the ends of the first switching transistor M1. In the step-up DC-DC converter, the monitoring target gate signal GCS is the first gate signal GS1.

The current-direction detecting circuit 10 can also be applied to a hysteresis controlled DC-DC converter. In this case, the current-direction detecting circuit 10 of the embodiment is used instead of the error amplifier 22. Therefore, in the case that plural hysteresis controlled DC-DC converters are used, the reverse current can be detected without providing the general offset correctors in all the hysteresis controlled DC-DC converters. As a result, the circuit scale is significantly reduced, and a variation among the output signals of the plural hysteresis controlled DC-DC converters is suppressed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A current-direction detecting circuit configured to detect a direction of current being passed between a source end and a drain end of a switching transistor turning on and off based on a gate signal, the circuit comprising:

an amplifier configured to amplify a voltage on the source end to output a first amplified signal and configured to amplify a voltage on the drain end to output a second amplified signal;

a first offset compensation capacitor connected to a first output terminal of the amplifier, the first amplified signal being outputted from the first output terminal;

a second offset compensation capacitor connected to a second output terminal of the amplifier, the second amplified signal being outputted from the second output terminal;

a switch configured to form a first loop circuit comprising the amplifier and the first offset compensation capacitor based on the gate signal when the switching transistor is turned off, configured to form a second loop circuit comprising the amplifier and the second offset compensation capacitor based on the gate signal when the switching transistor is turned off, configured to supply a common reference voltage to the first loop circuit and the second loop circuit in such a manner that a charge is stored in the first offset compensation capacitor and the second offset compensation capacitor, and configured to end the first loop circuit and the second loop circuit based on the gate signal when the switching transistor is turned on; and a monitoring comparator configured to compare a first input signal with a second input signal and configured to output a signal in accordance with a comparison result when the switching transistor is turned on, the first input signal being input through the first offset compensation capacitor, the second input signal being input through the second offset compensation capacitor.

2. The circuit of claim 1, wherein when the switching transistor is turned on, the switch forms a comparator comprising the amplifier, the first offset compensation capacitor, the second offset compensation capacitor, and the monitoring comparator.

3. The circuit of claim 2, wherein the switch switches between a sampling mode and a detecting mode based on the gate signal, the first loop circuit and the second loop circuit being formed in the sampling mode, the comparator being formed in the detecting mode.

4. A DC-DC converter comprising: a first switching transistor whose one end is connected to a first power potential;

a second switching transistor whose one end is connected to a second power potential and another end of the second switching transistor is connected to another end of the first switching transistor;

a gate controller configured to output a gate signal to turn on and off the first switching transistor and the second switching transistor;

an inductor whose one end is connected to the other end of the first switching transistor and the other end of the second switching transistor; and a current-direction detecting circuit connected to a monitoring target transistor to be monitored and the gate controller, and configured to detect a direction of current being passed between one end and another end of the monitoring target transistor, the monitoring target transistor being one of the first switching transistor and the second switching transistor, wherein the current-direction detecting circuit comprises:

an amplifier configured to amplify a voltage on the other end of the monitoring target transistor to output a first amplified signal and configured to amplify a voltage on the one end to output a second amplified signal;

a first offset compensation capacitor connected to a first output terminal of the amplifier, the first amplified signal being outputted from the first output terminal;

a second offset compensation capacitor connected to a second output terminal of the amplifier, the second amplified signal being outputted from the second output terminal;

a switch configured to form a first loop circuit comprising the amplifier and the first offset compensation capacitor based on the gate signal when the switching transistor is turned off, configured to form a second loop circuit comprising the amplifier and the second offset compensation capacitor based on the gate signal when the switching transistor is turned off, configured to supply a common reference voltage to the first loop circuit and the second loop circuit in such a manner that a charge is stored in the first offset compensation capacitor and the second offset compensation capacitor, and configured to end the first loop circuit and the second loop circuit based on the gate signal when the switching transistor is turned on; and a monitoring comparator configured to compare a first input signal with a second input signal and configured to output a signal in accordance with a comparison result when the switching transistor is turned on, the first input signal being input through the first offset compensation capacitor, the second input signal being input through the second offset compensation capacitor.

5. The converter of claim 4, wherein when the first input signal is higher than the second input signal, the gate controller stops outputting the gate signal to turn on the second switching transistor and outputs the gate signal to turn off the second switching transistor.

6. The converter of claim 5, wherein when the monitoring target transistor is turned on, the switch forms a comparator comprising the first offset compensation capacitor, the second offset compensation capacitor and the monitoring comparator.

7. The converter of claim 6, wherein the gate controller generates a first gate signal to turn on and off the first switching transistor, and generates a second gate signal to turn on and off the second switching transistor, and the switch switches between a sampling mode and a detection mode based on at least one of the first gate signal and the second gate signal, the first loop circuit and the second loop circuit being formed in the sampling mode, the comparator being formed in the detection mode.

8. The converter of claim 4, wherein when the monitoring target transistor is turned on, the switch forms a comparator comprising the first offset compensation capacitor, the second offset compensation capacitor and the monitoring comparator.

9. The converter of claim 8, wherein the gate controller generates a first gate signal to turn on and off the first switching transistor, and generates a second gate signal to turn on and off the second switching transistor, and the switch switches between a sampling mode and a detection mode based on at least one of the first gate signal and the second gate signal, the first loop circuit and the second loop circuit being formed in the sampling mode, the comparator being formed in the detection mode.

10. A DC-DC converter comprising:

an inductor whose one end is connected to a first power potential;

a first switching transistor whose one end is connected to another end of the inductor;

a second switching transistor whose one end is connected to second power potential and another end of the second switching transistor is connected to another end of the first switching transistor and the other end of the inductor;

a gate controller configured to output a gate signal to turn on and off the first switching transistor and the second switching transistor; and a current-direction detecting circuit connected to a monitoring target transistor to be monitored and the gate controller, and configured to detect a direction of current being passed between one end and another end of the monitoring target transistor, the monitoring target transistor being one of the first switching transistor and the second switching transistor, wherein the current-direction detecting circuit comprises: an amplifier configured to amplify a voltage on the other end of the monitoring target transistor to output a first amplified signal and configured to amplify a voltage on the one end to output a second amplified signal; a first offset compensation capacitor connected to a first output terminal of the amplifier, the first amplified signal being outputted from the first output terminal; a second offset compensation capacitor connected to a second output terminal of the amplifier, the second amplified signal being outputted from the second output terminal; a switch configured to form a first loop circuit comprising the amplifier and the first offset compensation capacitor based on the gate signal when the switching transistor is turned off, configured to form a second loop circuit comprising the amplifier and the second offset compensation capacitor based on the gate signal when the switching transistor is turned off, configured to supply a common reference voltage to the first loop circuit and the second loop circuit in such a manner that a charge is stored in the first offset compensation capacitor and the second offset compensation capacitor, and configured to end the first loop circuit and the second loop circuit based on the gate signal when the switching transistor is turned on, and a monitoring comparator configured to compare a first input signal with a second input signal and configured to output a signal in accordance with a comparison result when the switching transistor is turned on, the first input signal being input through the first offset compensation capacitor, the second input signal being input through the second offset compensation capacitor.

11. The converter of claim 10, wherein when the first input signal is higher than the second input signal, the gate controller stops outputting the gate signal to turn on the second switching transistor and outputs the gate signal to turn off the second switching transistor.

12. The converter of claim 11, wherein when the monitoring target transistor is turned on, the switch forms a comparator comprising the first offset compensation capacitor, the second offset compensation capacitor and the monitoring comparator.

13. The converter of claim 12, wherein
the gate controller generates a first gate signal to turn on and off the first switching transistor, and generates a second gate signal to turn on and off the second switching transistor, and
the switch switches between a sampling mode and a detection mode based on at least one of the first gate signal and the second gate signal, the first loop circuit and the second loop circuit being formed in the sampling mode, the comparator being formed in the detection mode.

14. The converter of claim 10, wherein when the monitoring target transistor is turned on, the switch forms a comparator comprising the first offset compensation capacitor, the second offset compensation capacitor and the monitoring comparator.

15. The converter of claim 14, wherein
the gate controller generates a first gate signal to turn on and off the first switching transistor, and generates a second gate signal to turn on and off the second switching transistor, and
the switch switches between a sampling mode and a detection mode based on at least one of the first gate signal and the second gate signal, the first loop circuit and the second loop circuit being formed in the sampling mode, the comparator being formed in the detection mode.

* * * * *